United States Patent
Hsiao et al.

(10) Patent No.: US 10,540,378 B1
(45) Date of Patent: Jan. 21, 2020

(54) VISUAL SEARCH SUGGESTIONS

(71) Applicant: A9.com, Inc., Palo Alto, CA (US)

(72) Inventors: Edward Hsiao, Sunnyvale, CA (US);
Douglas Ryan Gray, Redwood City, CA (US); Nityananda Jayadevaprakash, San Jose, CA (US); Xiaofan Lin, Palo Alto, CA (US); Mark Jay Nitzberg, Berkeley, CA (US); Shruti Sheorey, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 649 days.

(21) Appl. No.: 15/195,445

(22) Filed: Jun. 28, 2016

(51) Int. Cl.
*G06F 17/30* (2006.01)
*G06F 7/00* (2006.01)
(Continued)

(52) U.S. Cl.
CPC ...... *G06F 16/3334* (2019.01); *G06F 16/3323* (2019.01); *G06K 9/18* (2013.01);
(Continued)

(58) Field of Classification Search
CPC ........ G06F 17/30663; G06F 17/30643; G06K 9/18; G06K 9/481; G06K 9/6256; G06K 9/6267; G06K 9/78
(Continued)

(56) References Cited

U.S. PATENT DOCUMENTS 8,086,619 B2 * 12/2011 Haahr ................. G06F 16/3326
707/765

8,392,435 B1 * 3/2013 Yamauchi ........... G06F 16/3322
707/749
(Continued)

OTHER PUBLICATIONS

A. L. Berger, V.J.D. Pietra, and S. A. D. Pietra. A maximum entropy approach to natural language processing. *Computational Linguistics*, 22 (1): 39-71, 1996.
(Continued)

*Primary Examiner* — Pavan Mamillapalli
(74) *Attorney, Agent, or Firm* — Hogan Lovells US LLP

(57) ABSTRACT

Approaches provide for analyzing image data to determine and/or recognize text in the image data. The recognized text can be used to generate a search query that can be automatically submitted to a search engine without having to type the search query to identify a product (or related products) associated with the image. For example, a camera of a computing device can be used to capture a live camera view (or single images) an item. An application executing on the computing device (or at least in communication with the computing device) can analyze the image data of the live camera view to determine a set of keywords (e.g., identified text) based on visual features extracted from the image data. The keywords can be used to query an index of product titles, common search queries, among other indexed data to return a ranked list of search suggestions based on a relevance function. The relevance function can consider the ordering of the keywords to rank search suggestions more highly that contain the keywords having the same word order. Further, the relevance function can consider the confidence of the visual recognition of each keyword, the confidence of each search suggestion, customer impact, as well as other factors to determine the ranking of the search suggestions. The search suggestions can be further refined to ensure search results that the user will be more likely to view and/or purchase.

20 Claims, 8 Drawing Sheets

(51) Int. Cl.
  *G06F 16/33*  (2019.01)
  *G06K 9/18*  (2006.01)
  *G06K 9/78*  (2006.01)
  *G06K 9/62*  (2006.01)
  *G06K 9/48*  (2006.01)
  *G06F 16/332*  (2019.01)

(52) U.S. Cl.
  CPC ........... *G06K 9/481* (2013.01); *G06K 9/6256* (2013.01); *G06K 9/6267* (2013.01); *G06K 9/78* (2013.01)

(58) Field of Classification Search
  USPC ......................................................... 707/723
  See application file for complete search history.

(56) References Cited

U.S. PATENT DOCUMENTS

| | | | | |
|---|---|---|---|---|
| 9,256,637 | B2* | 2/2016 | Rose | G06K 9/18 |
| 9,594,851 | B1* | 3/2017 | Chechik | G06F 16/90324 |
| 10,192,639 | B2* | 1/2019 | Sellars | G16H 50/20 |
| 2003/0069877 | A1* | 4/2003 | Grefenstette | G06F 17/30643 707/999.002 |
| 2011/0179021 | A1* | 7/2011 | Wen | G06F 17/30256 707/723 |

OTHER PUBLICATIONS

R. S. Cabral, F. De la Torre, J. P. Costeira, and A. Bernardino. Matrix completion for multi-label image classification. In *Advances in Neural Information Processing Systems* (NIPS), 2011.

J. Deng, W. Dong, R. Socher, L-J. Li, K, Li, and L. Fei-Fei ImageNet: A large-scale hierarchical image database. In *Proceedings of the IEEE Computer Vision and Pattern Recognition (CVPR)*, 2009.

J. Devlin, S. Gupta, R. Girshick, M. Mitchell, and C.L. Zitnick. Exploring nearest neighbor approaches for image captioning. arXiv preprint arXiv: 1505.04467, 2015.

J. Donahue, L. Anne Hendricks, S. Guadarrama, M. Rohrbach, S. Venugopalan K. Saenko, and T. Darrell. Long-term recurrent convolution and networks for visual recognition and description. In *Proceedings of the IEEE Conference on Computer Vision and Pattern Recognition (CVPR)*, 2015.

H. Feng, S. Gupta, F. Iandola, R. K. Srivastava, L. Deng, P. Dollar, J. Gao, X. He, M. Mitchell, J.C. Platt, et al. From captions to visual concepts and back. In *Proceedings of the IEEE Conference on Computer Vision and Pattern Recognition(CVPR)*, 2015.

Y. Gong, Y. Jia, T. Leung, A. Toshev, and S. Ioffe. Deep convolutional ranking for multilabel image annotation. arXiv preprint arXiv: 1312.4894, 2013.

M. Guillaumin, T. Mensink, J. Verbeek, and C. Schmid. Tagprop: Discriminative metric learning in nearest neighbor models for image auto-annotation. In *Proceedings of* IEEE International Conference on Computer Vision (ICCV), 2009.

Y. Guo and S. Gu. Multi-label classification using conditional dependency networks. In *Proceedings of the International Joint Conference on Artificial Intelligence (IJCAI)*, 2011.

S. Hochreiter and J. Schmidhuber. Long short-term memory. *Neural Computation*, 9 (8): 1735-1780, 1997.

Y. Jia, E. Shelhamer, J. Donahue, S. Karayev, J. Long, R. Girshick, S. Guadarrama, and T. Darrell, Caffe: Convolutional architecture for fast feature embedding. In *Proceedings of the ACM International Conference on Multimedia (ACM-MM)*, 2014.

A. Krizhevsky, I. Sutskever, and G. E. Hinton. ImageNet classification with deep convolutional neural networks. In *Advances in Neural Information Processing Systems* (NIPS), 2012.

T.-Y. Lin, M. Maire, S. Belongie, J. Hays, P. Perona, D. Ramanan, P. Dollar, and C. L. Zitnick. Microsoft COCO: Common objects in context. In *Proceedings of the ACM International Conference on Multimedia (ACM-MM)*, 2014.

E. Lindholm, J. Nickolls, S. Oberman, and J. Montrym. NVIDIA Tesla: A unified graphics and computing architecture. *IEEE Micro*, (2):39-55, 2008.

O. Maron and T. Lozano-Perez. A framework for multiple-instance learning. In *Advances in Neural Information Processing Systems (NIPS)*, 1998.

J. Read, B. Pfahringer, G. Holmes, and E. Frank. Classifier chains for multi-label classification. *Machine Learning*, 85(3):333-359, 2011.

A. Shrivastava, T. Malisiewicz, A.-Gupta, and A. A. Efros. Data-driven visual similarity for cross-domain image matching. *ACM Transactions on Graphics (TOG)*, 30 (6):154, 2011.

K. Simonyan and A. Zisserman. Very Deep convolutional networks for large-scale image recognition. arXiv preprint arXiv: 1409.1556,2014.

C. Szegedy, W. Liu, Y. Jia, P. Sermanet, S. Reed, D. Anguelov, D. Erhan, V. Vanhoucke, and A. Rabinovich. Going deeper with convolutions. *In Proceeding of the IEEE Conference on Computer Vision and Pattern Recognition (CVPR)*, 2015.

\* cited by examiner

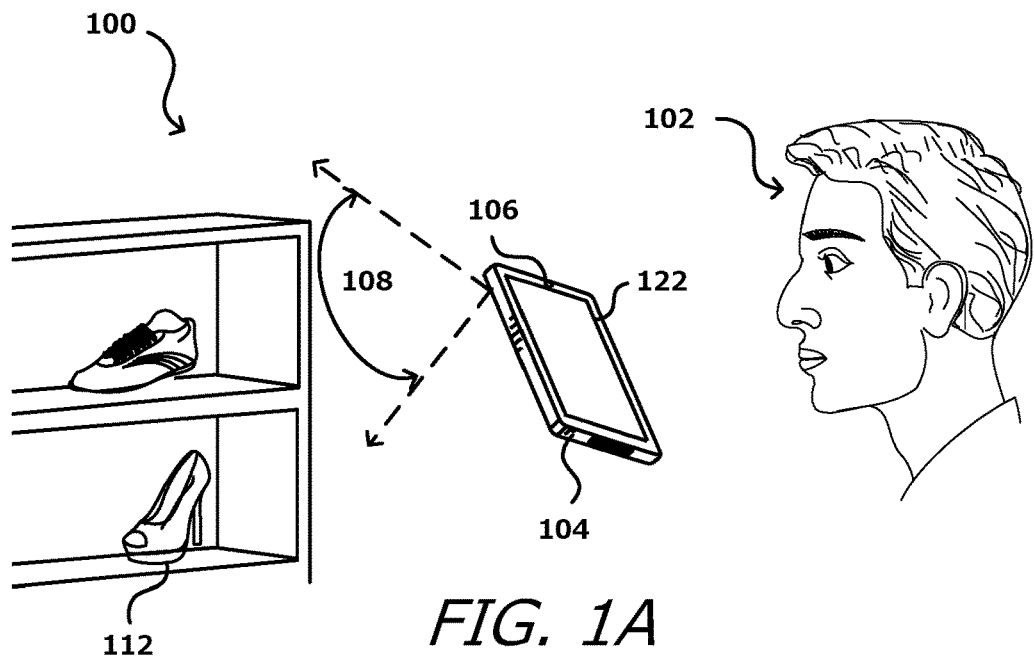
FIG. 1A
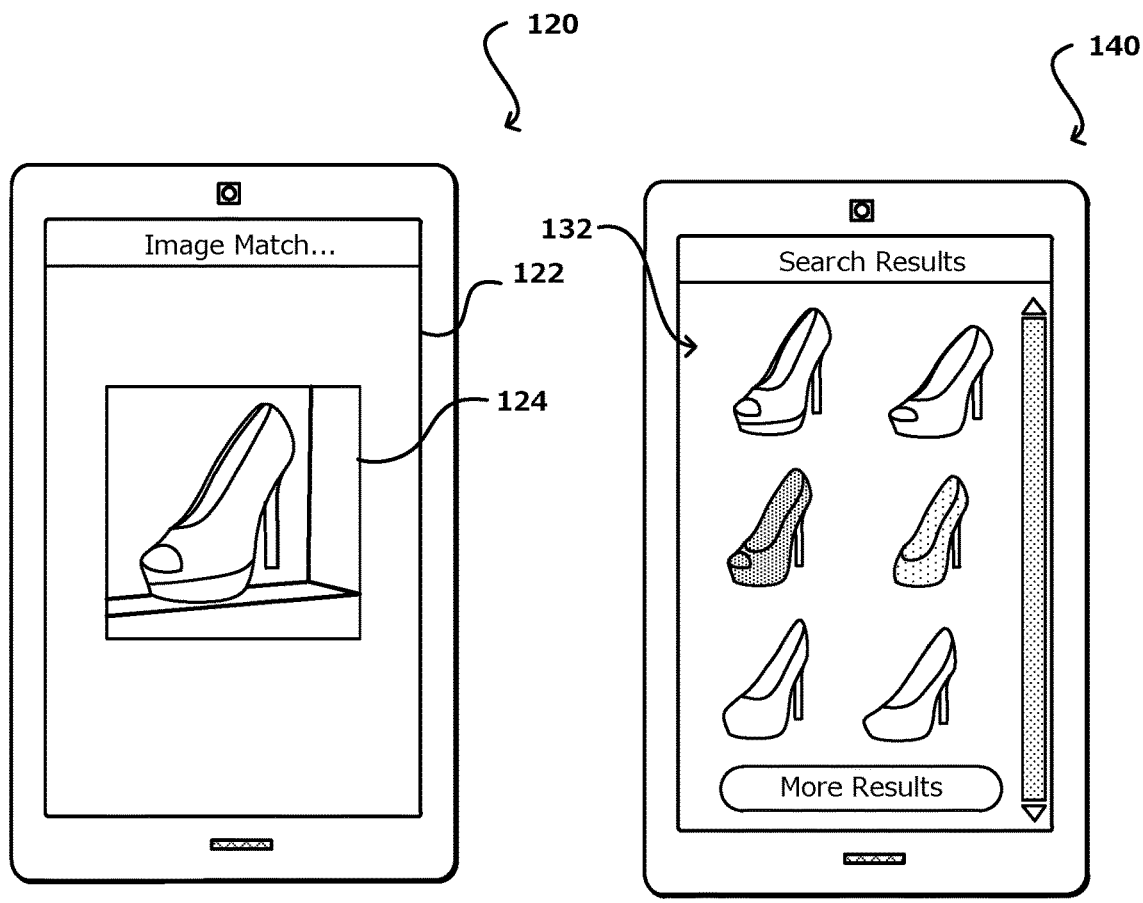
FIG. 1B
FIG. 1C

VISUAL SEARCH SUGGESTIONS

BACKGROUND

Users are increasingly utilizing electronic devices to obtain various types of information. For example, a user wanting to purchase a product might access an electronic marketplace in order to search the types of products offered through that marketplace. Unless the user knows an exact brand or style of product that the user wants, however, the user might have to search through hundreds or thousands of different products using various options to attempt to locate the type of product in which the user is interested. If the user is interested in a product of a specific type, the user might have no option but to sift through these results. Further, it can be cumbersome to describe a product and refine the results when using standard text input. In some situations, a user interested in acquiring information about a product can capture an image of the product and submit the captured image to an object recognition system to obtain information associated with the product. However, conventional object recognition approaches may not be able to successfully and/or quickly identify all types of products. In either situation, the process can be time consuming and potentially frustrating for a user, which can result in the user not locating an item of interest and the marketplace not completing a transaction.

BRIEF DESCRIPTION OF THE DRAWINGS

Various embodiments in accordance with the present disclosure will be described with reference to the drawings, in which:

FIGS. 1A, 1B, and 1C illustrate an example in which a user can attempt to capture an image in an attempt to locate information about an item in accordance with various embodiments;

DETAILED DESCRIPTION

Figure 2:
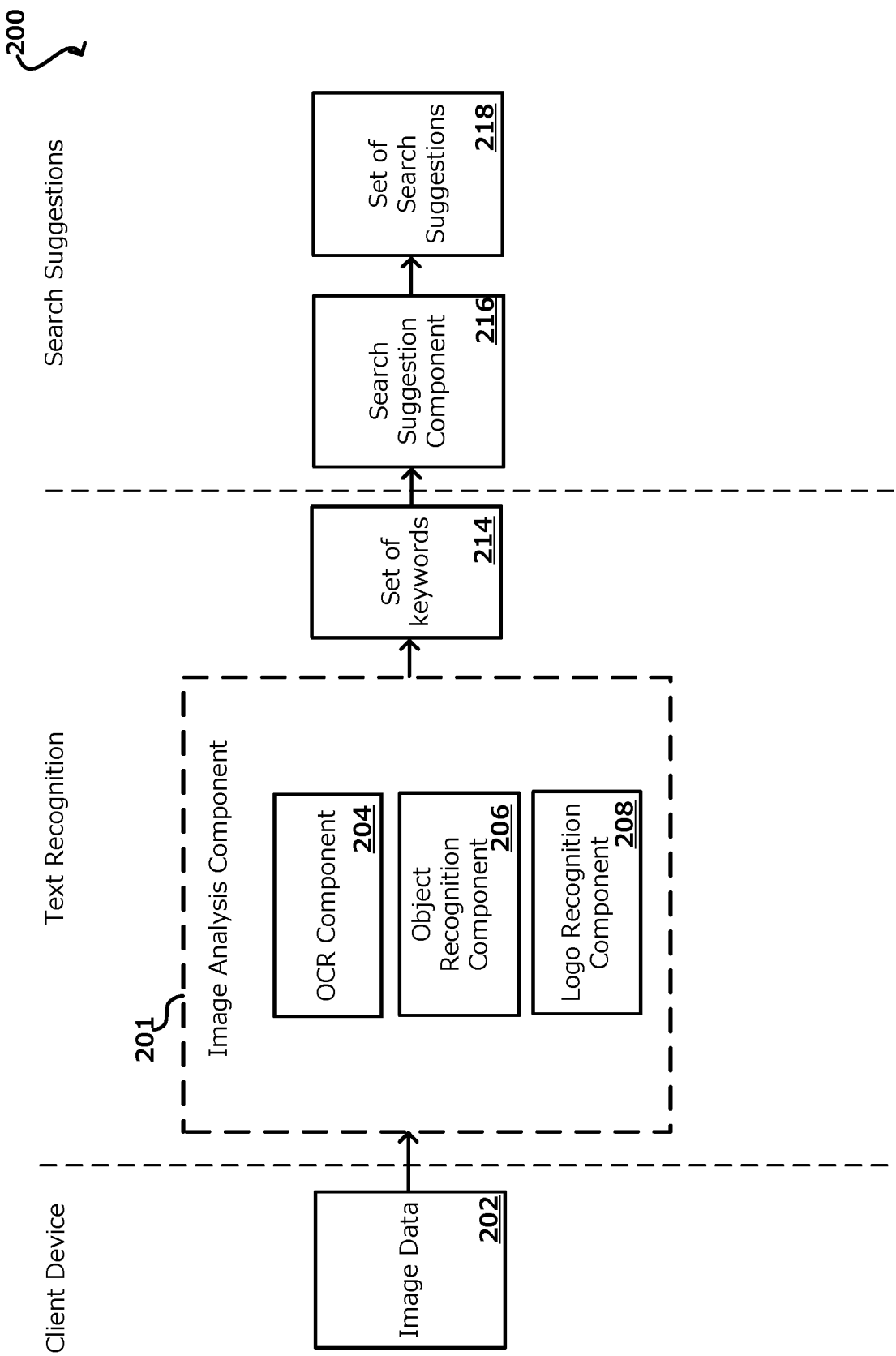
FIG. 2 illustrates an example data flow through a system in accordance with an embodiment.

Systems and methods in accordance with various embodiments of the present disclosure overcome one or more of the above-referenced and other deficiencies in conventional approaches to providing users with information via a computing device. In particular, various embodiments provide for analyzing image data that includes a representation of an item to determine and/or recognize text in the image data. The recognized text can then be used to generate a search query that can be automatically sent to a search engine without having to type the search query to identify a product (or related products) associated with the image.

For example, a camera of a computing device can be used to capture a live camera view (or single images) of one or more items. An application executing on the computing device (or at least in communication with the computing device) can analyze the image data to determine a set of keywords (e.g., words) based on visual features extracted from the image data. As will be described further herein, the image data can be analyzed using different techniques to determine the keywords, such as an optical character recognition (OCR) technique, an object recognition technique, a logo recognition technique, among other such techniques. The keywords can be used to query an index of product titles, common search queries, among other indexed text based on a relevance function in order to determine search suggestions that are most relevant to the text identified from the image data. In at least some embodiments, the relevance function can consider the ordering of the keywords in order to rank search suggestions more highly that contain the keywords in the same order. Further, the relevance function can consider the confidence of the visual recognition of each keyword, the confidence of each search suggestion, customer impact, as well as other factors. The search suggestions can be refined to ensure search results that the user will be more likely to view and/or purchase. Thereafter, at least one of the search suggestions can be sent to a search engine to obtain a set of search results, such as may be associated with an electronic marketplace to return information for relevant products. Upon receiving, from a user, a touch (or other) selection to a product in the search results, additional information for the associated product(s) can be displayed, enabling the user to learn more about and/or purchase the product from the electronic marketplace.

Various other functions and advantages are described and suggested below as may be provided in accordance with the various embodiments.

FIG. 1A illustrates an example situation 100 in which a user 102 is attempting to locate information for an item 112 in accordance with various embodiments. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. The user can position the device such that one or more items of interest 112 are within a field of view 108 of at least one camera 106 on the computing device. The camera might capture video, such that a "live" view of the captured video information can be displayed on a display screen 122 of the computing device 104, as illustrated in the example situation 120 of FIG. 1B. In other embodiments, the camera might capture a still image 124 showing a representation of the item(s) of interest. In at least some embodiments, the image and/or a frame of the video can be analyzed, such as by analyzing on the device or uploading across a network to a service for analyzing image content.

Conventional approaches attempt to analyze the image using an optical character recognition technique to recognize words and combine words into a search string using a template-based approach, e.g., choosing words corresponding to a brand, an object type, a color, etc. However, this type of approach is not robust and may generate an arbitrary search string which may not provide search results relevant to the items represented in the image data. Another approach attempts to generate search strings by concatenating recognized words. However, this approach can result in random search results. Accordingly, in accordance with various embodiments, approaches described herein a set of keywords based on visual features extracted form an image can be determined. The keywords can be grouped in useful search suggestions that can be used to find items, products, services, among other such items. For example, as shown in example 140 of FIG. 1C, in response to analyzing the image 124, a set of search suggestions can be generated, and a text search can be automatically invoked without having to type the search query to identify a product (or related products) associated with the image. In this example, a set of search results 132 that includes shoes are displayed in response to automatically submitting a text search to the search engine of, for example, an electronic marketplace.

FIG. 2 illustrates an example data flow through a system 200 in accordance with an embodiment. In this example, a user is using a camera of a computing device to capture image data 202 of a live camera view of one or more items. The items in this example can include text, logo, among other markings. It should be noted that in various embodiments the image data can be downloaded to the computing device. The image data can be analyzed using software or a set of software components as may include an image analysis component 201 executing on the computing device (or in communication with the computing device). The image analysis module can include one or more software components. As shown in FIG. 2, the image analysis component 201 includes an optical character recognition (OCR) component 204 to recognize words in the image data, an object recognition component 206 to determine words (e.g., tags, labels, etc.) describing an item(s) represented in the image data, and a logo recognition component 208 to recognize brand logos (e.g., words describing a brand logo, brand logo features, etc.) represented in the image data. It should be noted that the subject application also relates to the utilization of other computer vision techniques such as image match, deep learning, human recognition, poselet analysis, scene understanding, for example, to analyze images, and generate words to describe those images.

The OCR component 204 can be configured to implement an OCR process. In this example, the image data 202 is received at the image analysis component 201. The OCR component can recognize each word represented in the image data and assign a score representing a confidence that word is recognized correctly. In at least one embodiment, the recognized words can be ranked according to respective confidence values. In at least one embodiment, the confidence value for each recognized word can be adjusted using a distance from image center based word prioritization. For example, when users scan a particular word or item, they tend to try to center the word or item in the view finder of the image capture application. Accordingly, words or text strings can be reprioritized based on their distance from the center of the image frame. That is, the word closest to the center may keep its current confidence value and all other words are rescored based on their distance from the center. For example, the farther away from the center a word is located, the more its score is reduced.

The object recognition component 206 can be configured to recognize an item represented in the image data and generate labels or other descriptors that correspond to an item category of the item represented in the image data and characteristics of the image data, including characteristics of the item represented in the image data. Example item categories include, women's clothing, shoes, jewelry, watches, handbags, cameras, fashion, etc. Example labels or descriptors include words for the characteristics. Characteristics include attributes of the image or items, such as color, brand name, material, etc.

The logo recognition component 208 can be configured to extract features of logos represented in the image data and recognize the logo, as may include determining a brand, company, organization, service, etc. associated with the logo. In accordance with various embodiments, any number of approaches can be used to implement an OCR process, an object recognition process, or a logo recognition process to determine characteristics of the image data, including characteristics of the item represented in the image data. One such example includes a neural network-based approach. In this approach, a neural network can be used to train a first classifier algorithm to recognize words, a second and a third classifier algorithm to determine one or more categories (apparel, shoes, etc.) and characteristics (e.g., color, material, etc.) respectively, and a fourth classifier algorithm to recognize logos. For example, for the first classifier, a convolutional neural network (CNN) can be trained on a data set of words and the trained classifier can be recognize words in the image data. Such can approach can include, for example, analyzing the image data to generate a classification vector or other categorization value that indicates a probability that respective regions of the image data includes an instance of a word. The classification vector can include an entry (i.e., a probability) for each of the words the first classifier is trained to recognize.

The second classifier can be a CNN trained on a data set that includes item categories, e.g., dress, pants, watches, etc. to determine an item category of the item represented in the image data. For example, the second classifier algorithm can be configured to analyze at least a portion of the image data to generate a feature vector, categorization value, weighting, or other score that indicates a probability that the image data includes an instance of a certain category. As described, a category can refer to, for example, a class or division of items regarded as having particular shared characteristics. An example category can be Sports and Outdoors, Beauty, Health and Grocery, Books, Movies, Music and Games, Clothing, Shoes, and Jewelry, among others. The feature vector can include an entry (i.e., a probability) for each of the categories the second classification algorithm is trained to recognize. The probabilities can be utilized to generate a probability distribution of output category data, where the, for example, highest probability can be selected to determine a category of the item represented in the image data.

The third classifier can be a recurrent neural network (RNN) trained on a data set that includes images and descriptions of the respective images to recognize descriptions those images. The RNN then can use a predicted feature vector to begin generating words in an attempt to output an appropriate word or sequence of words to describe the image. Each module in the RNN can be a replicated neural network, and each previously generated word can be used to generate a next word. The image and the previous word are used as inputs to the RNN, which then predicts the next word. In accordance with various embodiments, generally, an RNN includes an input word layer, a recurrent layer, and an output layer in each time frame. Activation of the input layer at a given time can be a current word vector. RNNs can generate words or characters one at a time to predict string descriptions of an image, for example. RNNs can be capable of determining which parts of an image are more discriminative for a given category and can learn which parts of an image on which to focus to predict each of the words in a caption or other description sequence, such as a search string sequence.

The image analysis component 201 generates a set of keywords 214 that include words corresponding to the recognized text from the OCR component 204, the labels and tags corresponding to an item category of the item represented in the image data and characteristics of the image data from the object recognition component 206, and words, descriptors, and other information corresponding to a logo, brand, etc. from the logo recognition component 208. Each keyword can be associated with a confidence value as determined from the component that determined the keyword. A search suggestion component 216 or other such component is operable to group the keywords into plausible search suggestions based on a relevance function. For example, the set of keywords can be used to query an index to determine a ranked list of likely search suggestions (i.e., a set of candidate search suggestions) based on the relevance function. In various embodiments, only keywords with at least a minimum confidence score or a group of a predetermined number of highest scored keywords is used to query the index. The index can include product titles of products offered through an electronic marketplace, common search queries submitted to the electronic marketplace, time aggregated usage information about search queries, browse actions and individual products, metrics collected for keyword searches such as daily clicks, adds, purchases, order product sales, among other indexed text. The index can be an inverted index or other such index. An inverted index is an index data structure storing a mapping from content, such as words or numbers, to its locations in a database file, or in a document or a set of documents (named in contrast to a Forward Index, which maps from documents to content). Put another way, an inverted index consists of a list of all the unique words that appear in any document, and for each word, a list of the documents in which it appears.

In accordance with various embodiments, the relevance function can consider, for example, the ordering of the keywords in order to rank search suggestion more highly that contain the keywords in the same order, the confidence value associated with each key word, customer impact, as well as other such factors. It should be noted that approaches for generating relevancy scores are known in the art for such purposes. One example relevance function can be represented as:

$$r = \frac{1}{\sqrt{|T|}} \sum_{i \in Q} \hat{p}_i \cdot 1(i \in T)] + \alpha * \log(1 + OPS)$$

where r is the relevance score for a search suggestion, $\hat{p}_i$ is the confidence value for each respective keyword i, Q is the set of M keywords with a highest probability, T is the set of normalized words (e.g., tokens) for a search query in the index, and ($i \in T$) represents an indicator which is 1 if keyword i is in the list of tokens and 0 otherwise. The sum of the confidence values can be weighed by the inverse square root of the number of tokens so that more keywords are added if they provide enough value and OPS represents customer impact. It should be noted that other metrics such as clicks, purchases, among other metrics can be used instead of customer impact. The weighting factor α can control how much customer impact influences the importance of a search query. For example, generic search suggestions such as "laptops" can have a high OPS while specific search suggestions can be lower. In accordance with an embodiment, querying the index using the relevance function can include first identifying search queries and titles in the index that include a word of the set of words. The identified search queries and titles is the set of candidate search suggestions. For example, in the situation where the set of words includes metal and laptop, the index will be queried to identify titles including the word metal, titles including the word laptop, search queries including the word metal, and search queries including the word laptop. A relevance score can be determined for each candidate search suggestion based on a number of keywords from the set of keywords included in a respective candidate search suggestion, a confidence value associated with each of the keywords, and customer impact for each of the candidate search suggestions. The candidate search suggestions can be ranked based on respective relevance scores.

In accordance with various embodiments, the candidate search suggestions can be refined during a post processing process of the candidate search suggestions. For example, in various embodiments, it is unlikely that words from the set of keywords will be the only words in the candidate search strings. For example, if the keywords include "metal and keyboard," the candidate search suggestions might include "razor metal widow keyboard" and "black ops 3 keyboard." The additional words (i.e., "razor", "widow", "ops" and "3") are not one of the keywords and thus based on visual characteristics of the image. Accordingly, to refine the set of candidate search suggestions the candidate search suggestions can be restricted to only contain keywords and stop words such as an, the, and, has, but, etc. In addition, many candidate search suggestions include words in a different order, such as "black keyboard" and "keyboard black," where the ordering of the words may impact the relevancy of the candidate search suggestions. For example, the OCR component can recognize words that, when taken in a particular order, can be used to determine more relevant search suggestions. Thus, in addition to considering all the recognized keywords as in the first refining step, the relative ordering of those keywords can be considered as well. In this example the location of each identified keyword appearing in the image data used in the set of keywords can be recorded. This includes not only the locations of the various keywords that appear in the image data, but also the location of any other term (or character or string) that was recognized from the image data. A new "order" score can then be determined for the candidate search suggestion based at least in part upon the order of the identified keywords. For example, if the original keywords were A, B, C, D, then a candidate search suggestion with A, C, D would have a higher relevancy score than A, D, C. Such a result can help to reduce false positives by lowering the relevancy of results where some of the keywords may appear, but in orders different than were present in the image data.

In addition to determining an order score for the candidate search suggestions, the candidate search suggestions can be analyzed to attempt to determine the presence of a model number, product identifier, item code, or other such string. In at least some embodiments, uncommon words such as model numbers can help to very accurately identify a particular product or item associated with those uncommon words. For example, while many products might include a word such as "liquid," a very limited set of products might have associated strings such as "D234AS-3." While such information can be highly indicative of the correct match, the uncommonness of these words can prevent them from being accurately identified by the OCR component in some cases or situations, such that it can be desirable to still utilize other information discussed and suggested herein. In this example, the keywords can be analyzed to attempt to determine whether any of the keywords match a known model number or product identifier. If so, those keywords can be given a substantial up-weighting. Similarly, the keywords can be analyzed to attempt to determine whether any of the keywords match patterns for model numbers or identifiers, even if those numbers or identifiers may not be include in the relevant dictionary or data store of words. This helps to improve accuracy by increasing the scope of potential model numbers and identifiers that may not be in a fixed dictionary, as introducing a pattern-based model number identification algorithm can help to recover additional model numbers missed by the creators or maintainers of the dictionary. Various patterns can be used for recognition, as may include strings of a range of lengths that may include numbers or specific characters, as well as capital letters or other such inclusions. Various patterns can be generated for matching, whereby strings with certain locations of numbers or letters are more likely identified as model numbers. Further, certain brands might use certain model number patterns, and if a brand name is identified then the associated model number patterns can be given more weight in attempting to locate model numbers from the text. A model score can then be updated based at least in part upon any model number being identified in the text. In some cases each word can have a multiplier of 1 if not a model number and a multiplier of greater than 1 (e.g., 5) if determined to be a model number. In some embodiments the multiplier might be greater (e.g., 5) for a known model number than (e.g., 2) for a string that was not recognized but matches the pattern of a model number. A total relevancy score for a candidate search suggestion can be generated based at least in part upon the index relevancy score, the order score, and the model score. This can be the result of an additive function, such as may be given by:

total relevancy=index relevancy+order score+model score or total relevancy=index relevancy*order score*model score or total relevancy=index relevancy*(order score+model score)

among other such options. In at least some embodiments a machine learning algorithm can be used that can monitor user interaction with the search results after the new scores are determined, as well as user actions after obtaining these results. The machine learning algorithm can then learn, over time, which of the above functions (or other related functions) provides the most accurate results and can use that function going forward. Additional monitoring can occur such that the formulas can be updated over time as appropriate. If there are determined to be additional search results to be analyzed, the process can continue with total relevancy scores being generated for those results as well.

In various embodiments, the candidate search suggestions can be ranked by total relevancy score to determine a set of search suggestions 218. The set can include a predetermined number of highest candidate search suggestions, for example. The search suggestion associated with the highest ranked relevancy score can be submitted to a search engine. In some embodiments, a candidate search suggestion must be associated with at least a minimum relevancy score before being returned as a candidate search suggestion. Thereafter, at least one search suggestion of the set of search suggestions 218 can be sent to a search engine to obtain a set of search results, such as may be associated with an electronic marketplace to return information for relevant products.

Figure 3A:
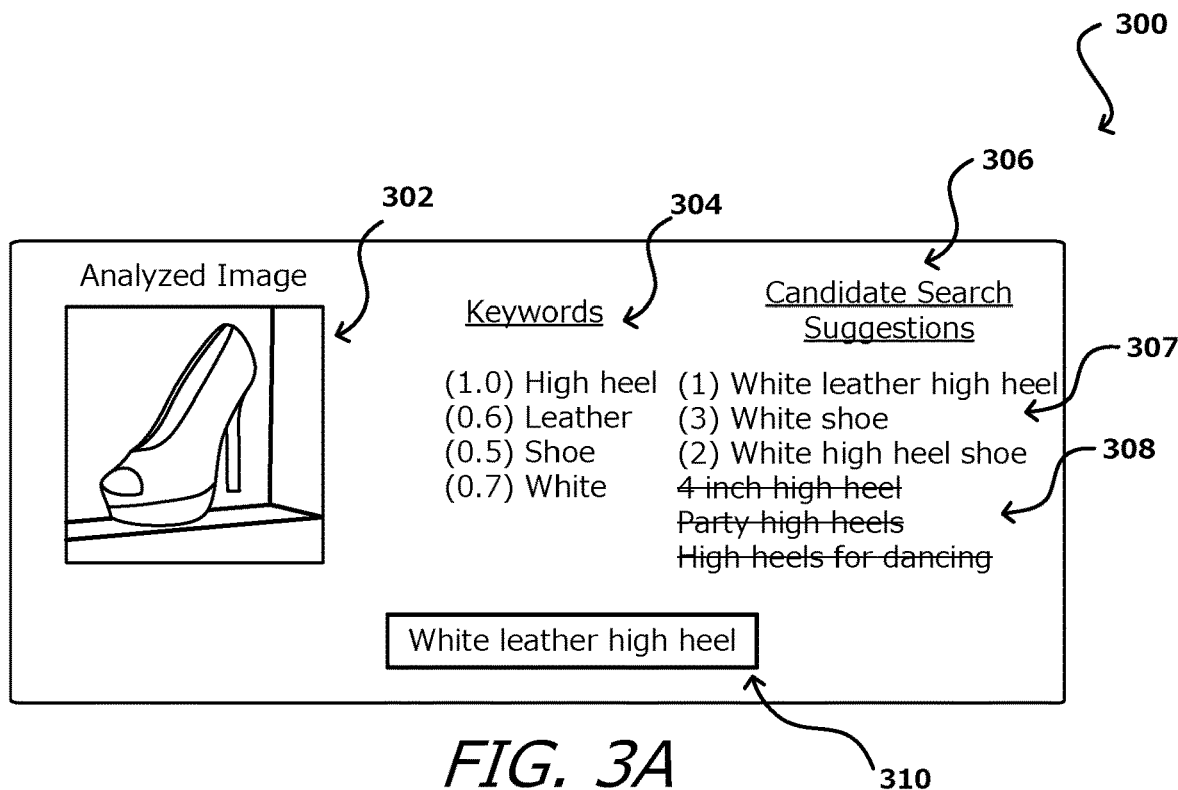
FIGS. 3A and 3B illustrate example search suggestions that can enable a user to perform a search in accordance with various embodiments.

As described, image data can be analyzed to determine a set of keywords (e.g., identified text) based on visual features extracted from the image data and the keywords can be used to generate search suggestions, at least one of which can be submitted to a search engine to identify a product associated with the image data. As shown in example 300 of FIG. 3A, image data 302 that includes a representation of a high heel shoe is analyzed. The image data can be captured by a camera of a computing device, downloaded, or otherwise obtained. An application executing on the computing device or at least in communication with the computing device can analyze the image data 302 to determine keywords 304 (i.e., high heel, leather, shoe, white.) As shown, the keywords are associated with a confidence value. The confidence value is a score representing a confidence that the word is identified correctly. The confidence score can be assigned by the process used to identify respective keywords. As described, the image data can be analyzed using an optical character recognition (OCR) technique, an object recognition technique, a logo recognition technique, among other such techniques. In this example, because there are is no text or logos represented in the image data, the object recognition technique would likely determine the keywords and corresponding confidence scores. The keywords can be used to generate a set of ranked search suggestions 307. This can include using the keywords to query an index of product titles, common search queries, among other indexed text to return a list of candidate search suggestions 306. The candidate list of search suggestions 306 can go through a relevance ranking process in order to determine as well as rank search suggestions that are most relevant to the text identified from the image. In this example, the relevance function can consider the confidence of the visual recognition of each keyword and the confidence of each search suggestion. Other factors that can be considered include a customer impact metric, ordering of keywords, etc. As shown in FIG. 3A, keyword "high heel" received a high confidence score, where 1 is the highest confidence score and 0 is the lowest confidence score. The relevance of each search suggestion can be based on a number of keywords in a search suggestion and their respective confidence score. In this example, the search suggestion "white leather high heel" includes the most number of keywords and can be assigned the highest relevance score for this factor. The phrase "white high heel shoe" includes just as many keywords; however, the relevancy score (at least for this factor) of this search suggestion is less than the highest ranked search suggestion 310, due in part to the confidence scores of the keywords identified in this search suggestion being less than the confidence scores of the keywords in the highest ranked search suggestion 310. The candidate search suggestions can be further refined to ensure search results that the user will be more likely to view and/or purchase. For example, the candidate search suggestions can be restricted to only search suggestions that contain keywords. In this example, search suggestions "4 inch high heel," "party high heel," and "high heels for dancing" 308 can be restricted because the search suggestions include words not in the list of keywords (i.e., words 4 inch, party, dancing). The search suggestion with the highest relevancy score, search suggestion 310, can be submitted to a search engine as a text search to retrieve search results that include products related to the search suggestion.

Figure 3B:
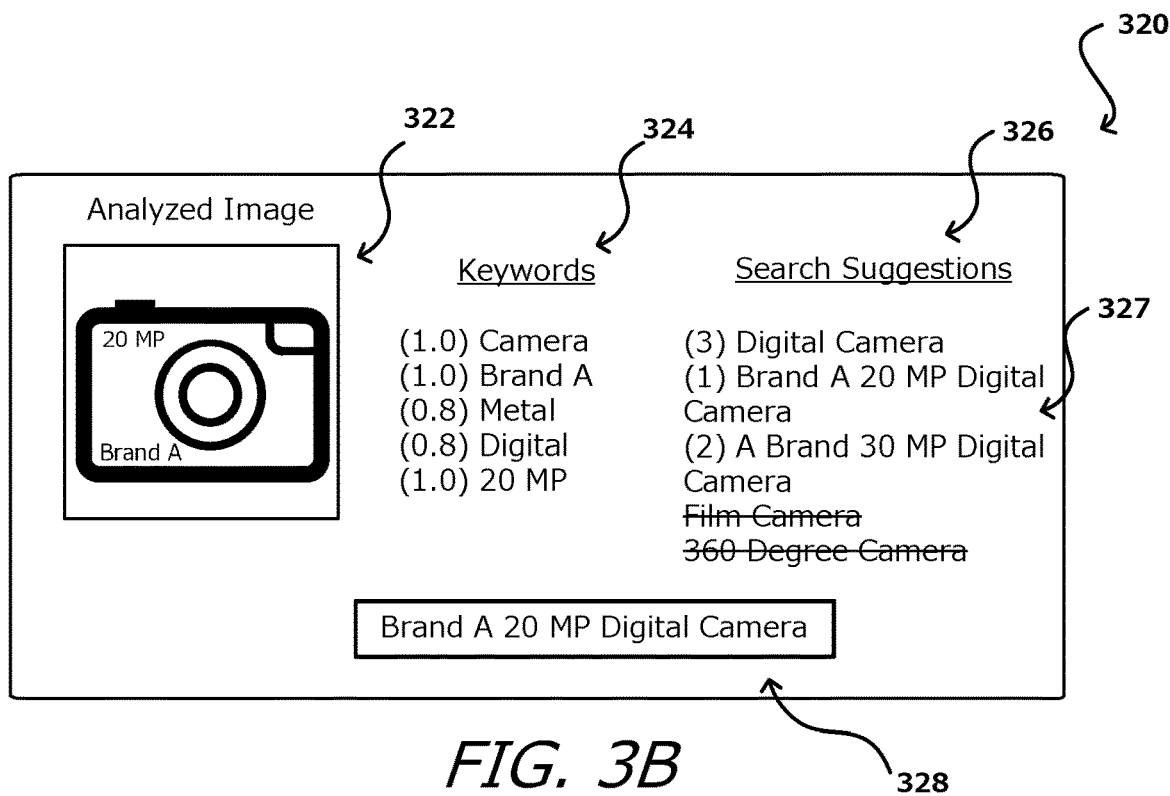

Example 320 of FIG. 3B illustrates another example of determining candidate search suggestions from an analyzed image. In this example, image data 322 that includes a representation of a camera is analyzed. The camera includes text corresponding to logo "Brand A" and text 20 MP. The image data 322 can be analyzed to determine keywords 324 (i.e., Camera, Brand A, Metal, Digital, 20 MP.) As shown, the keywords are associated with a confidence value. In this example, the keywords are determined using an optical character recognition (OCR) technique to recognize keyword 20 MP; an object recognition technique to identify keywords camera, metal, digital; and a logo recognition technique to recognize keyword Brand A. The keywords can be used to generate a ranked set of search suggestions 327 from a set of candidate search suggestions 326. The set of candidate search suggestions 326 can go through a relevance ranking process in order to determine the ranked set of search suggestions 327 that are most relevant to the text identified from the image. In this example, the relevance function can consider the ordering of the keywords in order to rank search suggestions more highly that contain the keywords in the same order, the confidence of the visual recognition of each keyword and the confidence of each search suggestion. The search suggestions can be further refined to ensure search results that the user will be more likely to view and/or purchase. For example, the search suggestions can be refined by restricting search suggestions to those that contain keywords. In this example, the search suggestion "Brand A 20 MP Digital Camera" includes the most number of keywords and can be assigned the highest relevance score for this factor. The phrase "A Brand 20 MP Digital Camera" includes just as many keywords; however, the relevancy score (at least for this factor) of this search suggestion is less than the highest ranked search suggestion 328, due in part to the order of keyword Brand A being the same in search suggestions "Brand A 20 MP Digital Camera." As described, the ordering of keywords can affect the relevancy score, where search suggestions including words in the same order as keywords words (e.g., words recognized using OCR and/or Logo recognition) can be weighted more. Search suggestion "Film Camera" and "360 Degree Camera" can be restricted from consideration because these search suggestions include words that are not keywords. The search suggestion with the highest relevancy score, search suggestion 328, can be submitted to a search engine as a text search to retrieve search results that include products related to the search suggestion.

Figure 4:
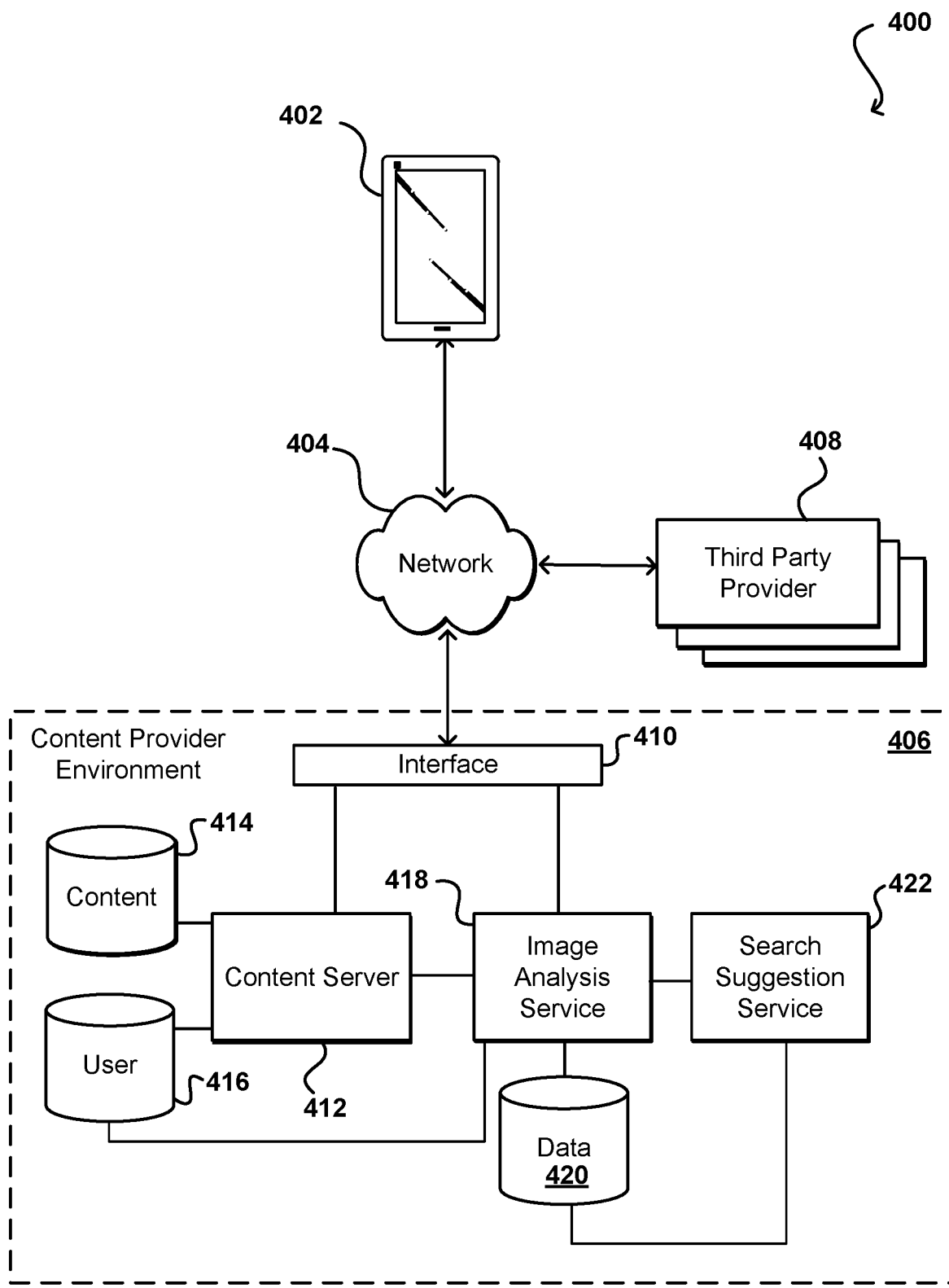
FIG. 4 illustrates an example system for identifying items and providing information about those items that can be utilized in accordance with various embodiments.

FIG. 4 illustrates an example environment 400 in which various embodiments can be implemented. In this example, a user is able to capture image data of a live camera view of one or more objects using a computing device 402. In various embodiments, the image data can be captured image data (e.g., still images and/or video data) or downloaded image data. An application executing on the computing device (or at least in communication with the computing device) can analyze the image data of the live camera view to determine and/or recognize text in the image data. The computing device can send at least a portion of information across at least one appropriate network 404, such as may include the Internet, a local area network (LAN), a cellular network, and the like. The request can be sent to an appropriate content provider 406, as may provide one or more services, systems, or applications for processing such requests.

In this example, the request is received to a network interface layer 410 of the content provider 406. The network interface layer can include any appropriate components known or used to receive requests from across a network, such as may include one or more application programming interfaces (APIs) or other such interfaces for receiving such requests. The network interface layer 410 might be owned and operated by the provider, or leveraged by the provider as part of a shared resource or "cloud" offering. The network interface layer can receive and analyze the request, and cause at least a portion of the information in the request to be directed to an appropriate system or service, such as a content server 412 (e.g., a Web server or application server), an image analysis service 418, among other such options. As described, the image analysis service 418 can analyze the image data of the live camera view to determine a set of keywords (e.g., identified text) based on visual features extracted from the image data. The keywords can be used by a search suggestion service 422 to generate a set of search suggestions. For example, the search suggestion service 422 can use the keywords to query an index of product titles in a catalog of products, common search queries, among other indexed text to return a ranked list of search suggestions. The index can be stored in data store 420 or other such data store, for example. The list of search suggestions can go through a relevance ranking process in order to determine search suggestions that are most relevant to the text identified from the image. In at least some embodiments, the relevance function can consider the ordering of the keywords in order to rank search suggestions more highly that contain the keywords in the same order. Further, the relevance function can consider the confidence of the visual recognition of each keyword, the confidence of each search suggestion, customer impact, as well as other factors. The search suggestions can be further refined to ensure search results that the user will be more likely to view and/or purchase. At least one of the search suggestions can be sent to a search engine to obtain a set of search results, such as may be associated with an electronic marketplace to return information for relevant products. For example, in the case of webpages, for example, at least one server might be used to generate code and send content for rendering the requested Web page and/or application data to display search results. The image analysis service, search suggestion service, or other services and/or components of the environment might access one or more data stores, such as a user data store 416 that contains information about the various users, and one or more content repositories 414 storing content able to be served to those users.

As mentioned, in at least some embodiments the content to be provided can include data 420 for training classifiers on object categories, words, and descriptions of images, or other such visual characteristics represented in the image data, for example by providing information to the image analysis service 418 or other such component or service, for analyzing the provided information and attempting to generate search suggestions, key words, or other elements as discussed herein. In some embodiments, this can utilize content generated within the content provider environment 406 or received from one or more third party providers 408, among other such options. For example, search suggestions, refinements, or key words can be generated using a collection of content obtained within the environment (such as data store 420) or received from the third party providers 408. A content manager or other such component or service can analyze an image to determine product categories, queries, refinements, text, and key words that correspond to individual items that have data stored in the content repository 414 or elsewhere in the content provider environment 406. This can include, for example, items available for consumption. As should be understood, each service and/or component can include one or more computing components, such as at least one server, as well as other components known for providing services, as may include one or more APIs, data storage, and other appropriate hardware and software components. It should be understood that, although the identification services are shown to be part of the provider environment 406 in FIG. 4, that one or more of these identification services might be operated by third parties that offer these services to the provider.

Figure 5:
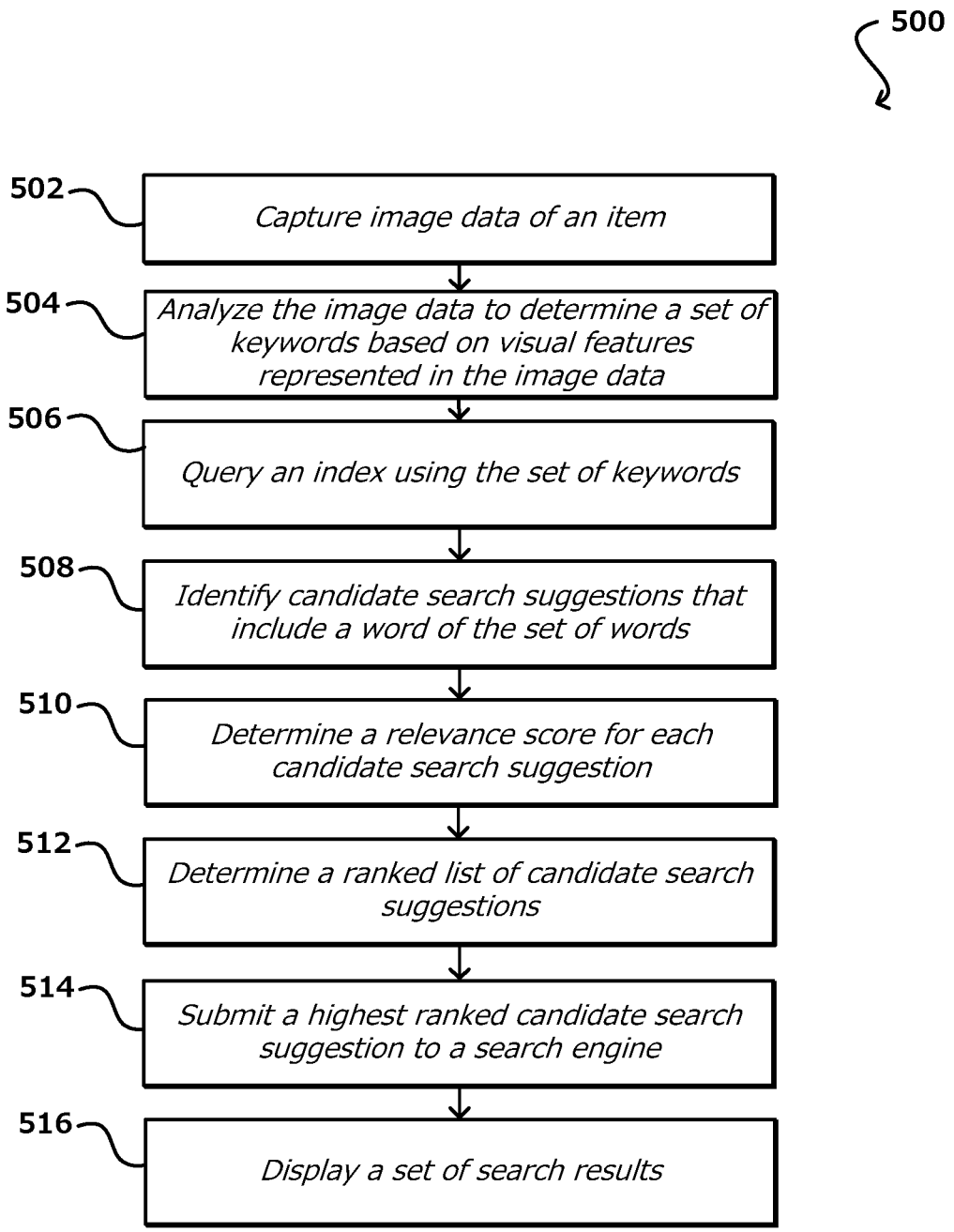
FIG. 5 illustrates an example process for generating search suggestions that can be utilized in accordance with various embodiments.

FIG. 5 illustrates an example process 500 for generating search suggestions that can be utilized in accordance with various embodiments. It should be understood that there can be additional, fewer, or alternative steps performed in similar or alternative orders, or in parallel, within the scope of the various embodiments unless otherwise stated. In this example, a camera of a computing device can be used to capture 502 image data of a live camera view of one or more items. The live camera view can be displayed to the user on a display screen of the computing device. An application executing on the computing device (or at least in communication with the computing device) can analyze 504 the image data of the live camera view to determine a set of keywords (e.g., identified text) based on visual features extracted from the image data. The image data can be analyzed using different techniques to determine the keywords, such as an optical character recognition (OCR) technique, an object recognition technique, a logo recognition technique, among other such techniques. As mentioned, each word determined or recognized can have an associated confidence value, and only words with at least a minimum confidence value may be considered. The keywords can be used to generate a set of search suggestions for submission to a search engine. For example, the keywords can be used to query 506 an index to determine a ranked list of search suggestions based on the set of keywords and a relevance function. The index can include, for example, product titles, common search queries, among other indexed text. Querying the index using the relevance function can include identifying 508 candidate search suggestions (e.g., search queries and titles) in the index that include a word of the set of words. A relevance score can be determined 510 for each candidate search suggestion based on a number of keywords from the set of keywords included in a respective candidate search suggestion, a confidence value associated with each of the keywords, an ordering of the keywords in the search suggestions, and customer impact for each of the candidate search suggestions. A ranked list of candidate search suggestions can be determined 512 based on respective relevancy scores. Thereafter, a highest ranked candidate search suggestions can be submitted 514 to a search engine to display 516 a set of search results, such as may be associated with an electronic marketplace to return information for relevant products. Upon receiving, from the user, a touch (or other) selection to a product listing, additional information for the associated product(s) can be displayed, enabling the user to learn more about and/or purchase the product from the electronic marketplace through the portable computing device, among other such options.

Figure 6:
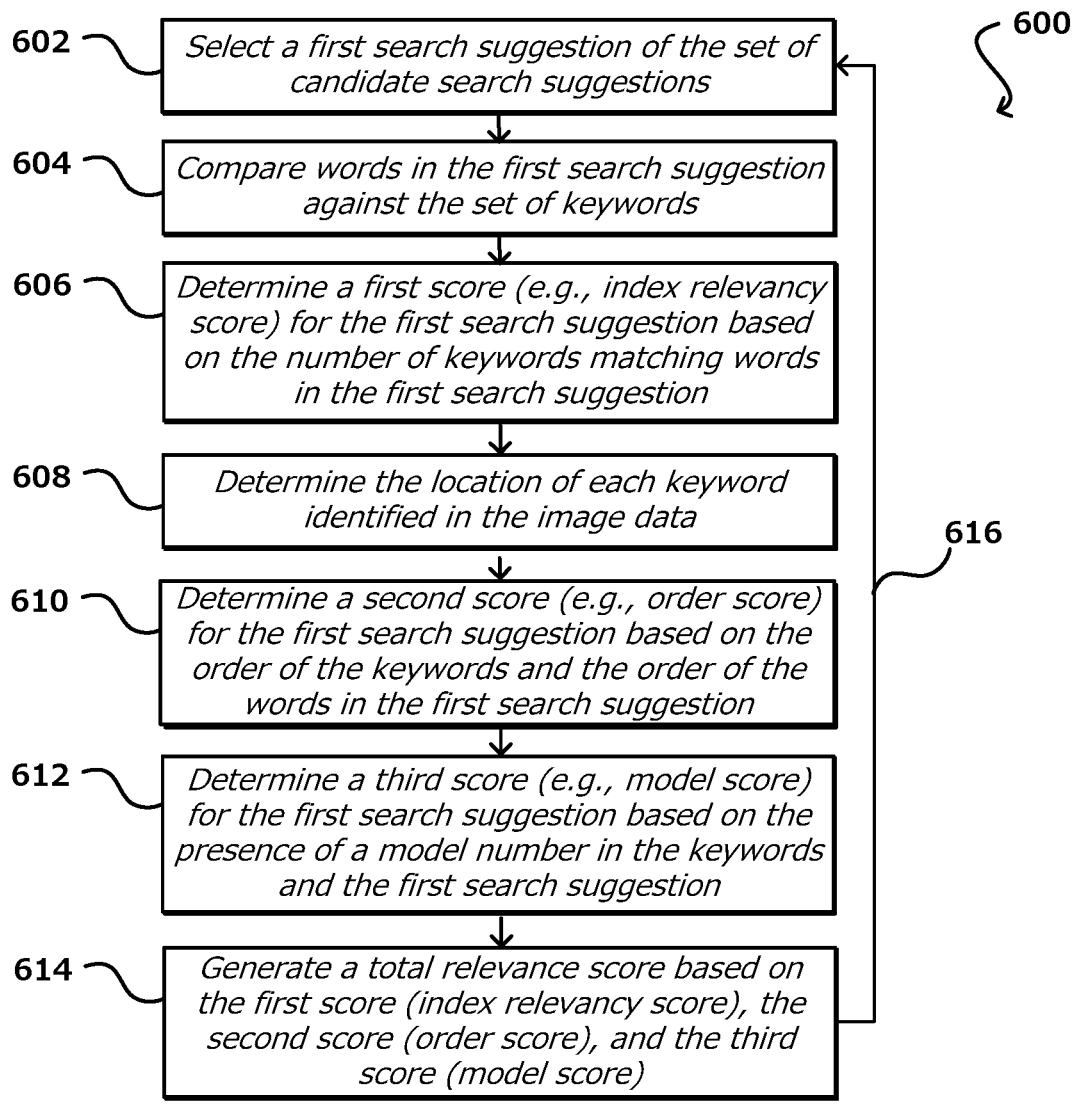
FIG. 6 illustrates an example process for determining a relevance score that can be utilized in ranking search suggestions in accordance with various embodiments.

In at least some embodiments, the search suggestions can come with a ranking or scoring indicating an amount of relevance of each search suggestions. FIG. 6 illustrates once such example process 600 for determining a relevance score in accordance with various embodiments. In this example, starting with selecting 602 a first search suggestion of the set of candidate search suggestions, the words of the first search suggestion can be compared 604 against all the keywords in the set of keywords recognized from the image data. A first score for the first search suggestion can be determined 606 based on a number of keywords matching words in the first search suggestion. In addition to considering all the recognized keywords, the relative ordering of the keywords can be considered as well. In this example, the location of each identified word appearing in image data can be determined 608. This includes not only the locations of the various keywords, but also the location of any other word (or character or string) that was recognized from the image data. A second score (e.g., "order" score) can be determined 610 for the first search suggestion based on the order of the keywords in the image data and the order of the words in the first search suggestion. For example, if the keywords were A, B, C, D, then a candidate search suggestion with A, C, D would have a higher relevancy score than A, D, C. Such a result can help to reduce false positives by lowering the relevancy of results where some of the keywords may appear, but in orders different than were present in the image data. In addition to determining a first score and a second score (e.g., order score) for the first search suggestion, the first search suggestion can be analyzed to attempt to determine 612 a third score based on the presence of a model number, product identifier, item code, or other such string in the keywords and the first search suggestion. In this example, the keywords can be analyzed to attempt to determine whether any of the keywords match a known model number or product identifier. If so, those keywords can be given a substantial up-weighting. Similarly, the keywords can be analyzed to attempt to determine whether any of the keywords match patterns for model numbers or identifiers, even if those numbers or identifiers may not be include in the relevant dictionary or data store of words. Further, certain brands might use certain model number patterns, and if a brand name is identified then the associated model number patterns can be given more weight in attempting to locate model numbers from the text. A total relevancy score for the search suggestion can be generated 614 based at least in part upon the first score (e.g., the index relevancy score), the second score (e.g. order score), and the third score (e.g., model score.) The process can be repeated 616 for each search suggestion in the set of search suggestions.

Figure 7:
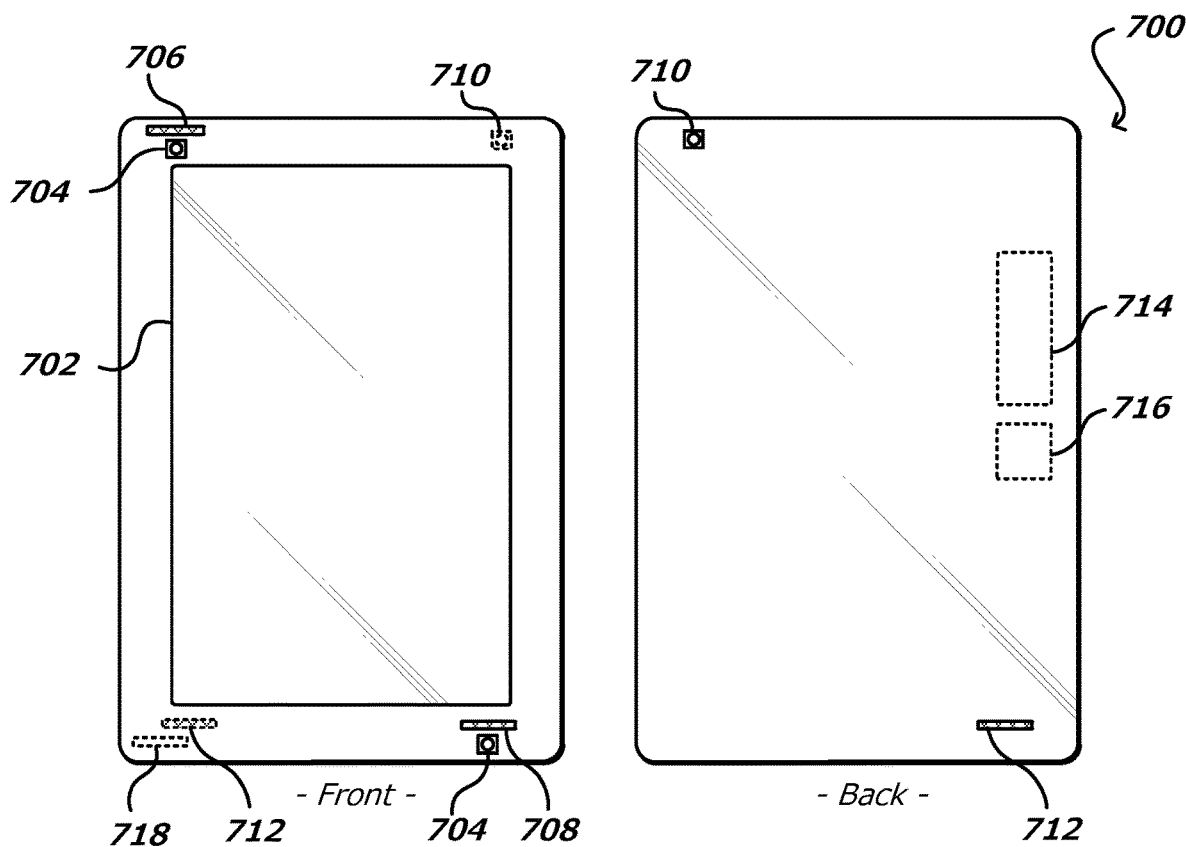
FIG. 7 illustrates an example computing device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display screen of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
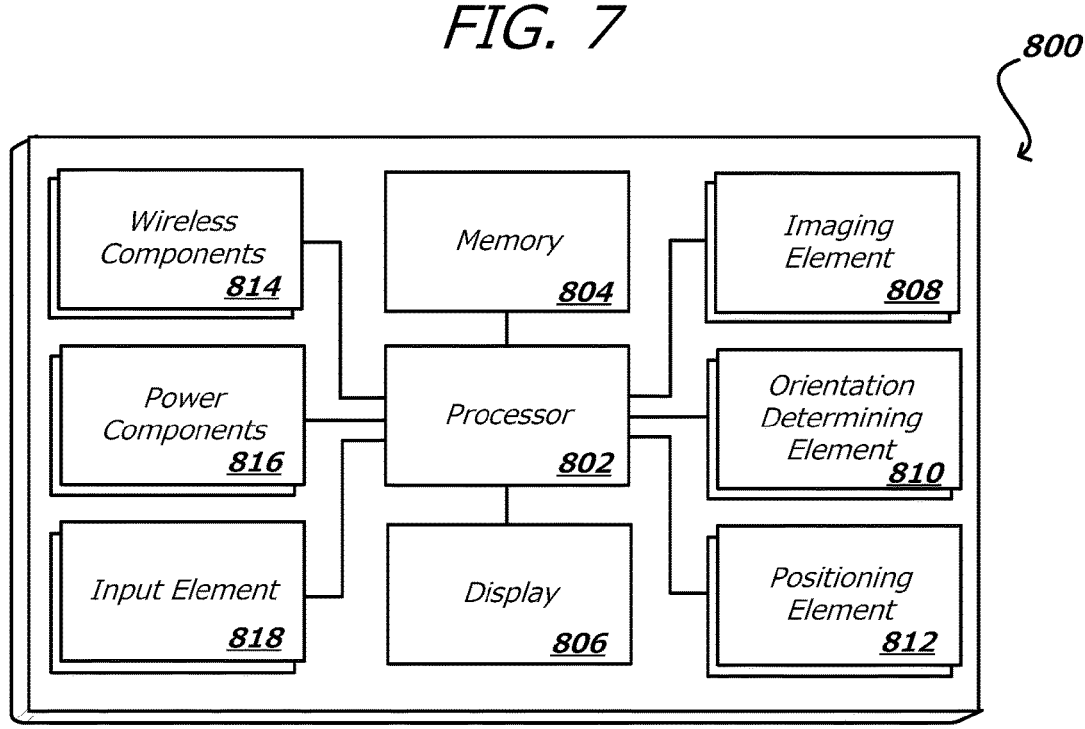
FIG. 8 illustrates example components of a computing device such as that illustrated in FIG. 7.

FIG. 8 illustrates a set of basic components of an electronic computing device 800 such as the device 800 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 9:
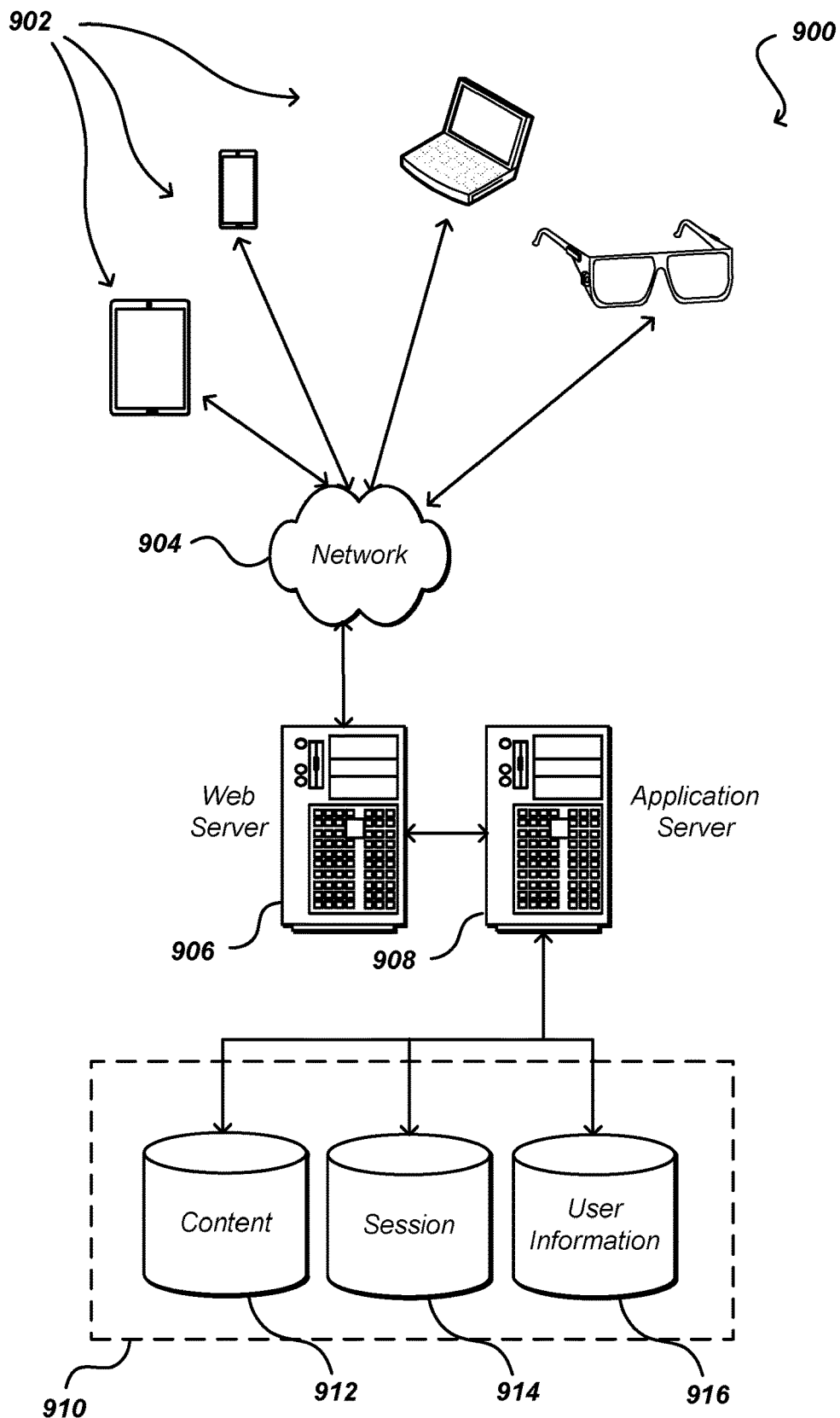
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers, surveillance cameras, cameras on vehicles, helmets and glasses, and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be other information that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
at least one processor;
a camera configured to capture image data over a field of view;
a display screen; and
memory including instructions that, when executed by the at least one processor, cause the computing device to:
capture the image data using the camera, the image data including a representation of an object and representation of text;
recognize a first set of words represented in the image data using an optical character recognition (OCR) technique, each word having a respective first confidence value;
determine a second set of words representing visual characteristics of the object using a classifier algorithm, each word having a respective second confidence value;
generate an unordered set of words that includes the first set of words and the second set of words;
query an index using the unordered set of words to determine a set of search suggestions based at least in part on a relevance function, respective first confidence values, and respective second confidence values, each search suggestion associated with a respective relevance score, the index including a plurality of past search strings and a plurality of product titles;
restrict the set of search suggestions to search suggestions including at least a subset of the unordered set of words to generate a subset of search suggestions;
determine an ordered relevance score for each of the subset of search suggestions based at least in part on an ordering of words in respective search suggestions;
associate a total relevance score with each of the subset of search suggestions based at least in part on respective relevance scores and respective ordered relevance scores;
determine a ranking of the subset of search suggestions based on respective total relevance scores; and
display search results for at least a highest ranked search suggestion of the subset of search suggestions on the display screen.

2. The computing device of claim 1, wherein the instructions when executed further cause the computing device to:
identify words in the subset of the unordered set of words corresponding to one of a model number for a product or a logo for the product; and
associate a weighting factor to identified words, wherein the total relevance score is further based on respective weighting factors of the identified words.

3. The computing device of claim 1, wherein the instructions when executed further cause the computing device to:
determine the ordered relevance score for each of the subset of search suggestions based at least in part upon how closely an ordering of words of the search suggestion matches an ordering of words from the first set of words determined using the OCR technique.

4. The computing device of claim 1, wherein the unordered set of words includes a third set of words corresponding to words included in a logo represented in the image data.

5. A computer-implemented method, comprising:
obtaining image data that includes a representation of an object;
determining a first set of words using optical character recognition (OCR) techniques on the image data, each word of the first set of words having a respective first confidence score;
determining a second set of words using object recognition techniques on the image data, each word of the second set of words having a respective second confidence score;
determining combined set of words associated with the representation of the object, the combined set of words including the first set of words and the second set of words;
querying an index with the combined set of words to determine a set of candidate search strings based at least in part on a relevance function, the first confidence scores, and the second confidence scores, each candidate search string associated with a respective relevance value; and
displaying the set of candidate search strings on a display screen of a computing device, wherein a selection of one of the set of candidate search strings is utilized to determine search results associated with the object.

6. The computer-implemented method of claim 5, the method further including:
using logo recognition techniques on the image data to determine a third set of words represented in image data, each word having a respective third confidence score,
wherein the combined set of words further includes the third set of words.

7. The computer-implemented method of claim 5, wherein querying the index using the relevance function further includes:
identifying search strings in the index that include at least one word of the combined set of words to determine the set of candidate search strings, each at least one word associated with a confidence value determined using one of a OCR technique, an object recognition technique, or a logo recognition technique;
associating a weight with each candidate search string based at least in part on a number of words from the combined set of words included in a respective candidate search string; and
determining the respective relevance value for each candidate search string using the relevance function based at least in part on respective confidence values for the combined set of words and respective weights for each candidate search string.

8. The computer-implemented method of claim 5, further comprising:
determining an ordered relevance score for each candidate search string based at least in part on an ordering of words in respective candidate search string to an ordering of words in the combined set of words.

9. The computer-implemented method of claim 8, further comprising:
determining a total relevance score for each candidate search string based at least in part on respective relevance scores and respective ordered relevance scores.

10. The computer-implemented method of claim 8, further comprising:
determining the ordered relevance score for a candidate search string based at least in part upon how closely an ordering of words of the candidate search string matches an ordering of words from the combined set of words determined using an OCR technique.

11. The computer-implemented method of claim 5, further comprising:
restricting the set of candidate search strings to those including at least a subset of the combined set of words to generate a subset of the set of candidate search strings.

12. The computer-implemented method of claim 5, wherein the combined set of words is determined by:
identifying respective confidence scores for each of a plurality of words as received from one of an OCR technique, an object recognition technique, or a logo recognition technique; and
selecting words from the plurality of words associated with a respective confidence score above a threshold confidence value to determine the combined set of words.

13. The computer-implemented method of claim 5, further comprising:
analyzing the set of candidate search strings based on respective relevance values to determine a candidate search string of the set of candidate search strings associated with a highest relevance value;
submitting a search query using the candidate search string associated with the highest relevance value; and
displaying search results on a display screen of a computing device.

14. The computer-implemented method of claim 13, wherein displaying the search results includes switching to a result view, the results view including one of a price of an item, a rating of the item, images of the item, or additional information about the item.

15. The computer-implemented method of claim 5, further comprising:
identifying words in the combined set of words corresponding to one of a model number for a product or a logo; and
associating a weighting factor to identified words,
wherein analyzing the set of candidate search strings to determine the candidate search string associated with the highest relevance value is further based on respective weighting factors associated with the identified words.

16. The computer-implemented method of claim 15, wherein the index is an inverted index and includes sets of words from one of product titles from a catalog of products offered through an electronic marketplace, search queries received by the electronic marketplace, time aggregated usage information about the search queries, browse actions associated with products of the catalog of products, click rate for each of the products, or profitability rate for each of the products.

17. A computing device, comprising:
at least one processor;
a camera configured to capture image data over a field of view;
a display screen; and
memory including instructions that, when executed by the at least one processor, cause the computing device to:
obtain image data from the camera that includes a representation of an object;
determine a first set of words using optical character recognition (OCR) techniques on the image data, each word of the first set of words having a respective first confidence score;
determine a second set of words using object recognition techniques on the image data, each word of the second set of words having a respective second confidence score;
determine a combined set of words associated with the representation of the object, the combined set of words including the first set of words and the second set of words;
query an index with the combined set of words to determine a set of candidate search strings based at least in part on a relevance function, the first confidence scores, and the second confidence scores, each candidate search string associated with a respective relevance value; and
display the set of candidate search strings on a display screen of a computing device, wherein a selection of one of the set of candidate search strings is utilized to determine search results associated with the object.

18. The computing device of claim 17, wherein the instructions when executed to query the index further cause the computing device to:
identify search strings in the index that include at least one word of the combined set of words to determine the set of candidate search strings;
associate a weight with each candidate search string based at least in part on a number of words from the combined set of words included in a respective candidate search string; and
determine the respective relevance value for each candidate search string using the relevance function based at least in part on respective confidence values for the combined set of words and respective weights for each candidate search string.

19. The computing device of claim 17, wherein the instructions when executed further cause the computing device to:
determine an ordered relevance score for each candidate search string based at least in part on an ordering of words in respective candidate search strings to an ordering of words in the combined set of words, wherein a total relevance score for each candidate search string is based at least in part on a respective relevance score and a respective ordered relevance score.

20. The computing device of claim 17, wherein the instructions when executed further cause the computing device to:

receive a selection of one of the candidate search strings;
submitting a search query using the selected candidate search string; and
displaying search results on a display screen of a computing device.

* * * * *